UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

CONTROLLING ALTERNATING-CURRENT MOTORS.

No. 822,345.

Specification of Letters Patent.

Patented June 5, 1906.

Application filed January 25, 1904. Serial No. 190,425.

*To all whom it may concern:*

Be it known that I, FRANK E. CASE, a citizen of the United States, residing at Schenectady, in the county of Schenectady and State of New York, have invented certain new and useful Improvements in Controlling Alternating-Current Motors, of which the following is a specification.

My invention relates to control systems for alternating-current motors; and its principal object is to provide a system especially adapted for the operation of a car or train of cars driven by alternating-current motors, although my invention is not limited to this particular application.

My invention is applicable to any system where a plurality of alternating-current motors must be simultaneously controlled from one or more points. These are the requirements in the control of a train of cars driven by motors on the several cars, and I shall accordingly illustrate and describe my invention as applied to a train-control system.

The system of control which I employ depends upon the variation of speed and torque of an alternating-current motor with variation of the impressed voltage. I have illustrated my invention as applied to a plurality of motors of the type known as "repulsion," in which current is supplied to the field, while the rotor-winding is equipped with a commutator and short-circuiting brushes. My invention, however, is not limited to this type of motor, but is equally applicable to other types of alternating-current motors in which the speed and torque may be controlled by varying the voltage—as is the case, for instance, in the ordinary series motor adapted for use with alternating currents. The voltage applied to a motor or to a group of motors may be varied conveniently by supplying the motor through a transformer or autotransformer, the latter being sometimes known as a "compensator," and by varying the effective number of turns to which the motor or group of motors is connected. By this means a considerable range of voltage impressed upon the motor may be obtained; but by my invention I greatly increase the range that may be obtained by combining two or more motors or groups of motors with their regulating transformers or compensators and varying the connections of the compensators to the source of supply. By this means I am enabled to obtain a much greater range of voltage and a more even and uniform acceleration of the motors than has been obtained by other systems.

Other features of my invention will appear from the following description and from the annexed drawings, in which—

Figure 1:
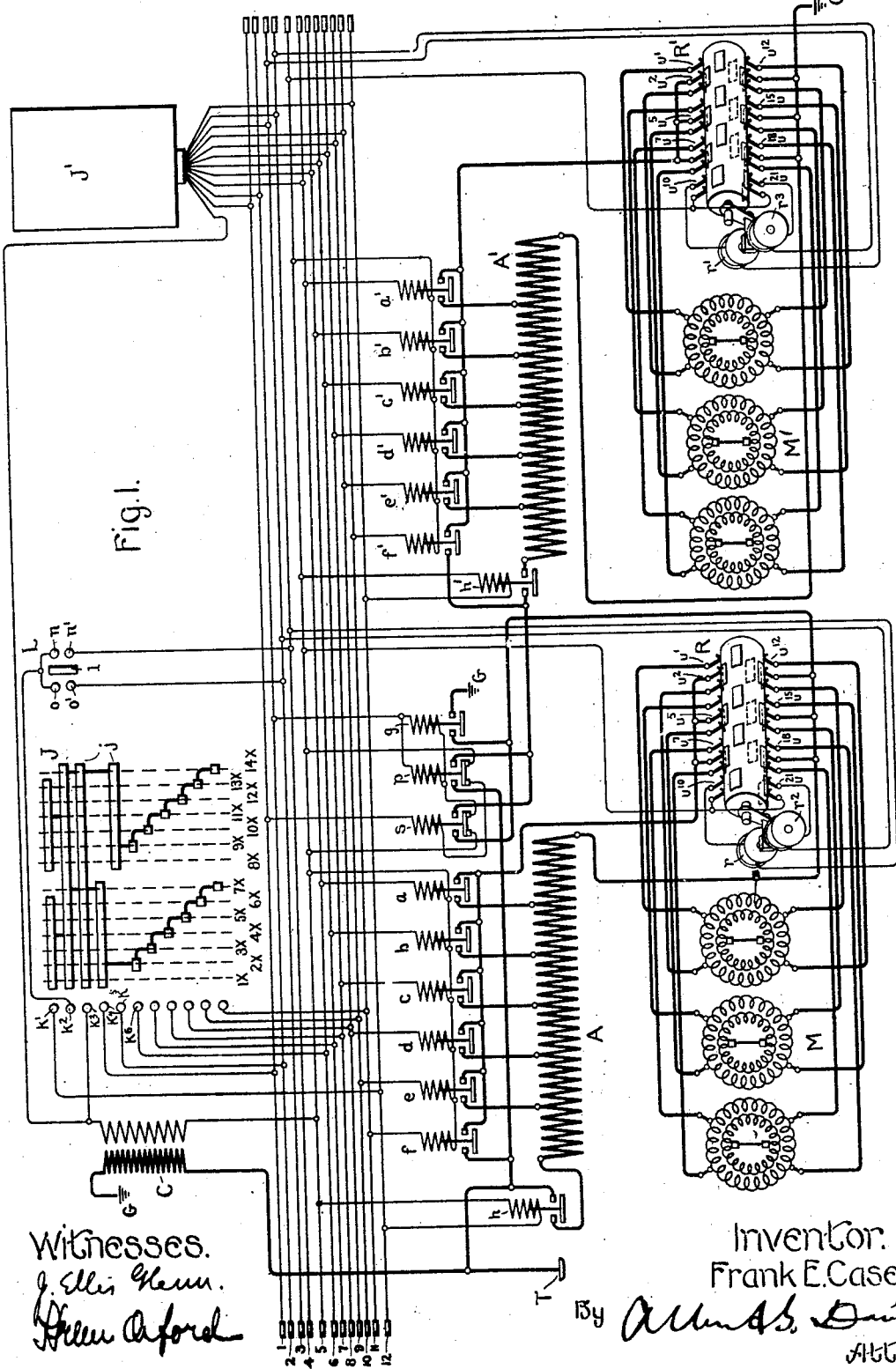
Figure 2:
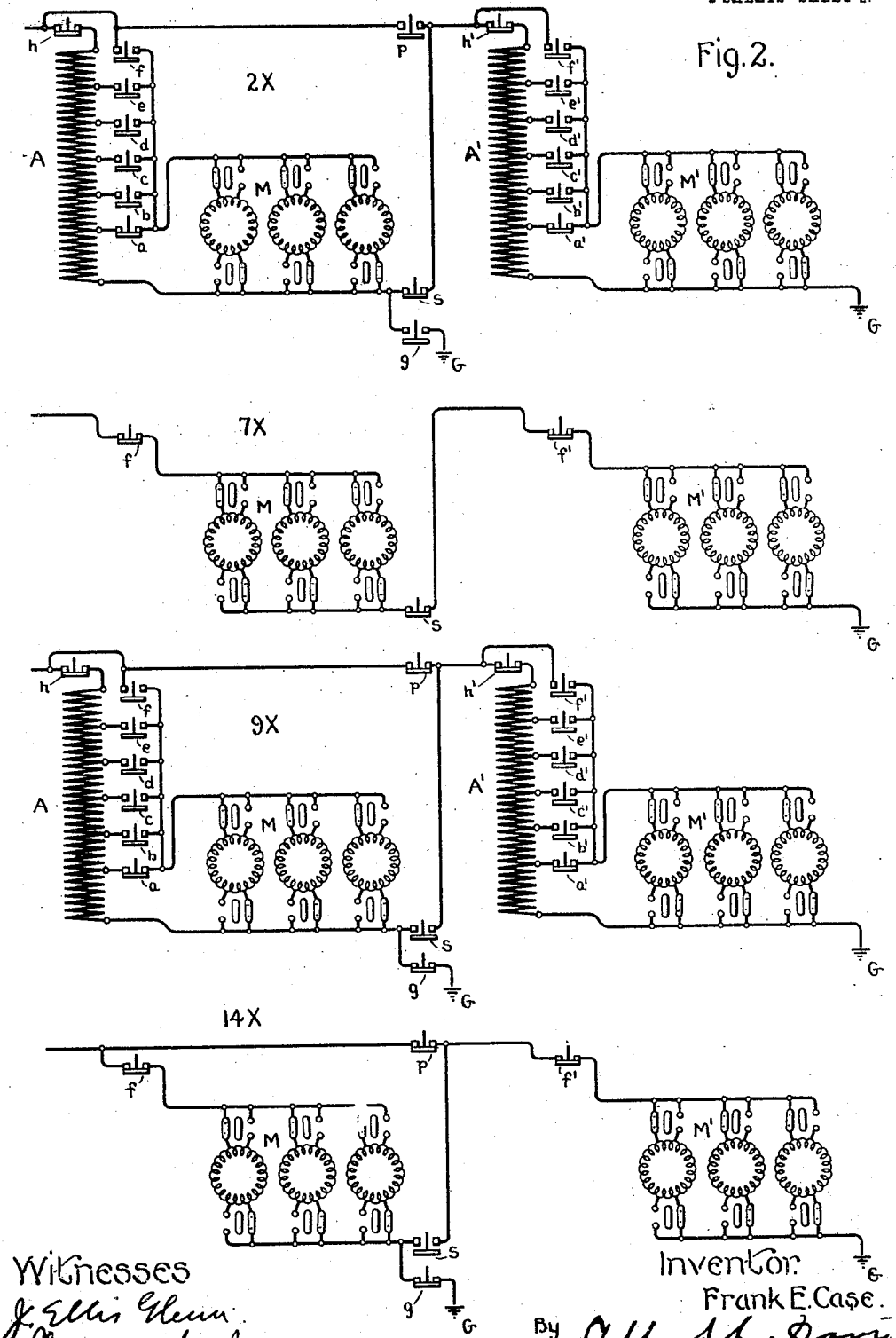

Figure 1 shows diagrammatically a system of control arranged in accordance with my invention, and Fig. 2 shows a series of diagrams illustrating some of the circuit arrangements claimed by my control system.

In illustrating my invention I have shown two groups of motors M and M', each group containing three motors. The number of motors in each group, however, is of no importance, but may be varied to suit the particular conditions of each case. Each group of motors is shown connected, through its reversing-switch R or R', to an autotransformer or compensator A or A', which in turn is connected to a trolley or collecting-shoe T. The motors, with their compensators and reversing-switches, comprise the work-circuit, which is shown in heavy lines. Switches $a$ $b$ $c$, &c., are arranged to connect the motors to different points on the compensator A, thus varying the voltage impressed upon the motors. The controlling-coils for switches $a$ $b$ $c$, &c., as well as the controlling devices for the reversing-switches R, are connected to the system of conductors 1 2 3, &c., to which is also connected a master-controller.

It will be understood that the circuits for a single car or locomotive are here shown and that the system of conductors 1 2 3, &c., may be extended to any length and that the controlling devices for any number of groups of motors, with their compensators, as well as any number of master-controllers, may be connected thereto. Terminal connections are indicated at each end of the system of conductors, and as train-control systems are well known in the art it is not necessary to illustrate the circuit for other cars, each car being merely a duplication of the system, as shown.

It will be seen from Fig. 1 that the current entering at the collecting device T divides, part passing through the primary of transformer C to ground. This transformer furnishes the current for the control system, which will be considered later. First, the work-circuit, consisting of the motors, compensators, and their switches, will be considered. It is evident that if switch $h$ is closed the current will pass through the compensator A to switch $s$. If switch $s$ is closed, the current will pass through switch $h'$, if it is closed, and through compensator $A'$ to ground G. Thus the closing of switch $s$ places the compensators in series. If, however, switch $s$ is open and switch $g$ is closed, the current from compensator A will pass directly to ground G, and if switch $p$ is also closed the current will pass from trolley T directly to compensator $A'$ and thence to ground G. Thus the closing of switches $g$ and $p$ places the two compensators in parallel. It will be seen that the right-hand end of compensator A is connected to fingers $u^{13}$, $u^{16}$, and $u^{19}$ of reversing-switch R. With the reversing-switch in the position shown the right-hand end of compensator A is connected through switch R to fingers $u^{14}$, $u^{17}$, and $u^{20}$ and thence to the lower right-hand tap of motors M. The current passes to the diagonally opposite tap of the motors M to contact-fingers $u^3$, $u^6$, and $u^9$, thence to fingers $u^2$, $u^5$, and $u^8$ and to the switches $a\ b\ c$, &c., the closing of any one of which will connect the motors across a certain portion of compensator A. If reversing-switch R is in its other position, contact-finger $u^2$ will be connected to contact-finger $u'$ instead of to contact-finger $u^3$, and the connections of the other contact-fingers will be similarly altered. The motor-taps which will then be connected to the compensator are the upper right-hand and lower left-hand taps. Thus by the movement of switch R from one position to the other the line of magnetization of the motors M is shifted through an angle corresponding to the angular displacement of the taps. By this means the direction of rotation of the repulsion-motors M is reversed, since the direction of rotation depends upon the relative positions of the line of magnetization and of the short-circuiting brushes and since the direction of rotation may be reversed by shifting either the line of magnetization or the brushes. Thus it is seen that the work-circuit comprises the switches $h\ h'$, the reversing-switches R R', the compensator A A', and the switches $a\ b\ c$, &c., and $a'\ b'\ c'$, &c., arranged to connect the motors to different points upon the compensator, and the other switches $s\ p\ g$, &c., for varying the connections of the compensators in the work-circuit. The operating devices for all these switches are connected to the train-conductors 1 2 3, &c. J' represents a master-controller connected to the train-conductors. J' is shown with its contacts developed in a plane at J. It comprises a main switch having movable contacts $j$ and the stationary contact-fingers $k'\ k^2$, &c., and a reversing-switch L. The switch-controlling coils, the train-conductors, and the master-controller comprise the control system, shown in light lines and connected to the secondary of transformer C. The current from the upper end of the secondary of transformer C divides, part passing from $k^3$ to contact-finger $k^2$ to switch L, and part passing to contact-fingers $k'$ and $k^4$ and thence to the train-conductors.

Taking up the former circuit first, it will be seen that if movable contact $l$ is in engagement with stationary contacts $o$ and $o'$ the current will pass from switch L to train-conductor 3, thence to coil $r^2$ of reversing-switch R to contact-finger $u^{21}$, to finger $u^{22}$, to train-conductor 5, and to the secondary of transformer C. Coil $r^2$ of reversing-switch R will thus be energized and the reversing-switch R moved to its opposite position. Fingers $u^{10}$ and $u^{11}$ will then be connected by a contact-segment of reversing-switch R, and if movable contact $l$ of switch L is moved into engagement with stationary contact $n$ and $n'$ coil $r$ of reversing-switch R will be energized and reversing-switch R will be returned to the position shown in the drawings. Thus it will be seen that the direction of rotation of the motors is reversed by reversing the position of switch L. Now assume that reversing-switches R and R' are in the position shown in Fig. 1. The circuit through master-controller J is as follows: from the upper end of the secondary of transformer C to finger $k^3$, to finger $k^4$, to train-conductor 1. From train-conductor 1 the current passes through the operating-coil of switch $s$ to train-conductor 5 and thence to the secondary of transformer C. Switch $s$ will be raised, placing the two compensators A and A' in series, as has been already described. It will be seen that switch $s$ in moving to its upper position to place the compensators in series opens the circuit of the controlling-coils of the switches $p$ and $g$. On the other hand, the upward movement of switch $p$ would open the circuit of the controlling device of switch $s$. Thus the two switches $s$ and $p$ are electrically interlocked, so that it is impossible to produce a short circuit by the closing of both switches at once. A second circuit through the master-controller when in the position indicated by $1^\times$ is from contact-finger $k^3$ to contact-finger $k'$, to train-conductor 12, through the actuating-coils of switches $h$ and $h'$ in parallel to train-conductor 5, to the secondary of transformer C. Switches $h$ and $h'$ are thus closed, closing the circuit from the collecting device T to ground. The circuit through the fields of the motors is still open, since all the switches $a\ b\ c$, &c., are open, and consequently only one terminal of the motors is connected to the compensating coil. Now when the master-controller J is moved to its second position, as indicated by the dotted line $2^\times$, another circuit is closed as follows: from contact-finger $k^3$, to contact-finger $k^6$, to train-conductor 6, through the controlling-coil of switches $a$ and $a'$, to train-conductor 5, to the secondary of transformer C. Switches $a$ and $a'$ are thus closed, and each group of motors is connected to a single section of its compensator. The motors accordingly start under a low-impressed voltage. As master-controller J is moved from position $2^\times$ to position $3^\times$ the only change that occurs is the opening of the circuit of the controlling-coil for switches $a$ and $a'$ and the closing of the circuits of the controlling-coils for switches $b$ and $b'$. The point of connection of the motors is thus shifted along the compensator, so that the motors receive a higher impressed voltage. As master-controller J is moved on through its various positions to position $7^\times$ switches $c\,d$, &c., are in turn closed, until when switches $f$ and $f'$ are closed the motors are connected across the terminals of the compensators. Furthermore, in passing from position $6^\times$ to position $7^\times$ contact-finger $k'$ leaves its contact, thereby opening the circuit of the controlling-coils for switches $h$ and $h'$. The compensators are thus cut out of circuit, thereby avoiding any waste of current in the compensators. As the master-controller J is moved from position $7^\times$ to $8^\times$ the circuits of the controlling-coils for switches $s$, $f$, and $f'$ are opened, allowing these switches to fall. Then as contact-finger $k^5$ comes into engagement with its movable contact the circuit is closed from contact-finger $k^3$ to contact-finger $k^5$, to train-conductor 2, through the coils of switches $g$ and $p$ in parallel, to train-conductor 5 and to the secondary of transformer C. The two compensators are thus in parallel, as has been already described, and when contact-finger $k'$ engages its second movable contact, switches $h$ and $h'$ are closed, connecting the two compensators in parallel to the source of current. When the position $9^\times$ of the master-controller is reached, the circuits of the coils of switches $a$ and $a'$ are again closed and the two groups of motors are again connected to their compensators. In passing through the different positions to $14^\times$ the switches $b\,c$, &c., are operated in turn. The point of connection of the motors is shifted along the compensator until at $14^\times$ the motors are again connected across the terminals of the compensator directly to the line. At this position also contact-finger $k'$ leaves its movable contact and switches $h$ and $h'$ are again opened, cutting the compensators out of circuit.

In Fig. 2 are shown diagrams corresponding to the positions of the master-controller $2^\times$, $7^\times$, $9^\times$, and $14^\times$. In position $2^\times$ the circuits at starting are shown with the two compensators in series and the motors connected across the first section of the compensators. In the diagram corresponding to position $7^\times$ the motors are shown connected in series with the compensators cut out. In the diagram corresponding to position $9^\times$ the compensators are shown in parallel with the motors connected to the first section of the compensators. In the diagram corresponding to position $14^\times$ the motors are shown connected in parallel with the compensators cut out.

The electrically-controlled switches, which are indicated in the drawings as $a\,b\,c$, &c., may be of any well-known type of switch suitable for the purpose. A number of such switches are well known in the art, and I do not consider it necessary to illustrate a particular form, since any well-known type of electrically-controlled switch suited for the purpose may be used.

Although I have illustrated a complete control system, it is evident that it is not necessary that a control system embodying my invention should contain all the elements illustrated and described or elements having the specific form shown. For instance, a different form of alternating motor may be used instead of the repulsion type as shown, a different form of reversing-switch may be used for the motors, and other parts of the system may be varied in form without departing from the spirit of my invention.

Other forms of voltage-regulating devices than the autotransformer or compensator here shown may be used, such as an ordinary regulating-transformer. It will be understood that when the word "compensator" is used in the appended claims it is not limited to the particular form shown, but is intended to include all forms of regulating-transformers. Accordingly I do not desire to limit myself to the particular construction and arrangement of parts here shown, since changes therein which do not depart from the spirit of my invention and which are within the scope of the appended claims will be obvious to those skilled in the art.

What I claim as new, and desire to secure by Letters Patent of the United States, is—

1. In combination, a plurality of alternating-current motors, compensators therefor, devices adapted to vary the points of connection of said motors to said compensators and for varying the relative connections of said compensators to each other, and means for controlling said devices from a distance.

2. In combination, a plurality of alternating-current motors, compensators therefor, and a control system adapted to vary the points of connection of said motors to said compensators and to vary the relative connections of said compensators to each other.

3. In combination, a plurality of alternating-current motors, compensators therefor, and a control system adapted to connect said compensators in series and to connect the motors to receive a fraction of the compensator voltage, then to shift the connection of the motors to receive the whole compensator voltage, then to connect the compensators in parallel and to connect the motors to receive a fraction of the compensator voltage, and then to shift the connections of the motors to receive the whole compensator voltage.

4. In combination, a plurality of alternating-current motors, compensators therefor, a control system comprising devices for varying the connections of said motors and compensators, and a master-controller adapted to control said devices and arranged to connect said compensators in series and to connect the motors to part of the compensator-windings, then to connect the motors across the whole compensator-windings, then to connect the compensators in parallel and to connect the motors to a part of the compensator-windings.

5. In combination, a plurality of alternating-current motors, compensators therefor, a control system comprising devices for varying the connections of said motors and compensators, and a master-controller adapted to control said devices and arranged to connect said compensators in series and to connect the motors to part of the compensator-windings, then to connect the motors across the whole compensator-windings, then to connect the compensators in parallel and to connect the motors to a part of the compensator-windings and to open the circuit of the compensator-windings.

6. In combination, a plurality of alternating-current motors, compensators therefor, and a control system adapted to vary the points of connection of said motors to said compensators and to vary the relative connections of said compensators and to open the circuits of said compensators when said motors are connected across the terminals thereof.

7. In combination, a plurality of groups of alternating-current motors, a source of current-supply therefor, and a control system adapted to vary the series-parallel connections of said groups and to vary the voltage impressed upon each group.

8. In combination, a plurality of alternating-current motors, a source of current supply, and a controlling system adapted to connect said motors in series and to impress upon said motors a fraction of the supply voltage then to increase to the full supply voltage the voltage impressed on said motors in series, then to connect said motors in parallel and to impress upon said motors a fraction of the supply voltage, and then to increase to the full supply voltage the voltage impressed upon said motors in parallel.

9. In combination, a plurality of alternating-current motors, compensators therefor, switches adapted to vary the points of connection of said motors to said compensators, switches adapted to vary the relative connections of said compensators to each other, and a control system comprising devices adapted to operate said switches.

10. In combination, a plurality of alternating-current motors, compensators therefor, switches adapted to vary the points of connection of said motors to said compensators, switches adapted to vary the relative connections of said compensators to each other, reversing-switches for said motors, and a control system comprising devices adapted to operate said switches.

11. In combination, a plurality of alternating-current motors, compensators therefor, switches adapted to vary the points of connection of said motors to said compensators, switches adapted to vary the relative connections of said compensators to each other, reversing-switches for said motors, a control system comprising devices adapted to operate said switches, a master control-switch, and a switch controlling the devices for said reversing-switches.

12. The method of controlling a plurality of alternating-current motors, which consists in connecting said motors to compensators, varying the points of connection of the motors to said compensators, and varying the relative connections of said compensators.

13. The method of controlling a plurality of alternating-current motors, which consists in dividing the motor into groups, connecting each group to a compensator, varying simultaneously the points of connection of each group to its compensator, and varying the relative connections of said compensators to the source of current.

14. The method of controlling a plurality of alternating-current motors, which consists in connecting said motors to compensators connected in series to the source of current, shifting the connections of said motors to said compensators to increase the voltage impressed upon said motors, then connecting said compensators in parallel to the source and then again shifting the connections of said motors to said compensators to increase the voltage impressed on said motors.

15. The method of controlling a plurality of alternating-current motors, which consists in dividing said motors into groups, connecting the groups to the compensators connected in series to the source of current, shifting the points of connection of said groups to said compensators to increase the voltage impressed on said groups, then connecting the compensators in parallel and again shifting the connections of said groups to the compensators to increase the voltage impressed on said groups.

16. The method of controlling a plurality of groups of alternating-current motors, which consists in varying the series-parallel connections of said groups and varying independently the voltage impressed on each group.

17. The method of controlling a plurality of alternating-current motors, which consists in connecting said motors in series and impressing on said motors a fraction of the supply voltage, then increasing to the full supply voltage the voltage impressed on said motors in series, then connecting said motors in parallel and impressing upon said motors a fraction of the supply voltage, and then increasing to the full supply voltage the voltage impressed on said motors in parallel.

In witness whereof I have hereunto set my hand this 22d day of January, 1904.

FRANK E. CASE.

Witnesses:
BENJAMIN B. HULL,
HELEN ORFORD.